(12) United States Patent
Zhao et al.

(10) Patent No.: US 11,338,249 B2
(45) Date of Patent: May 24, 2022

(54) ANTI-HAZE ANTI-HARMFUL GAS AIR FILTER MEMBRANE AS WELL AS PREPARATION METHOD AND APPLICATION THEREOF

(71) Applicant: Suzhou Institute of Nano-Tech and Nano-Bionics (Sinano), Chinese Academy of Sciences, Suzhou (CN)

(72) Inventors: Zhigang Zhao, Suzhou (CN); Zhen Wang, Suzhou (CN); Shan Cong, Suzhou (CN)

(73) Assignee: Suzhou Institute of Nano-Tech and Nano-Bionics, Chinese Academy of Sciences, Suzhou (CN)

( * ) Notice: Subject to any disclaimer, the term of this patent is extended or adjusted under 35 U.S.C. 154(b) by 367 days.

(21) Appl. No.: 16/482,540

(22) PCT Filed: Aug. 14, 2017

(86) PCT No.: PCT/CN2017/097363
§ 371 (c)(1),
(2) Date: Jul. 31, 2019

(87) PCT Pub. No.: WO2019/000602
PCT Pub. Date: Jan. 3, 2019

(65) Prior Publication Data
US 2021/0129087 A1    May 6, 2021

(30) Foreign Application Priority Data

Jun. 26, 2017 (CN) .......................... 201710492118.4

(51) Int. Cl.
*B01D 69/14* (2006.01)
*A41D 13/11* (2006.01)
(Continued)

(52) U.S. Cl.
CPC ............ *B01D 69/147* (2013.01); *A41D 13/11* (2013.01); *B01D 39/083* (2013.01);
(Continued)

(58) Field of Classification Search
None
See application file for complete search history.

(56) References Cited

U.S. PATENT DOCUMENTS

| 2011/0194304 | A1* | 8/2011 | Han | ...................... | D01D 5/0023 |
| | | | | | 977/773 |
| 2014/0332459 | A1* | 11/2014 | Hu | ....................... | B01D 69/148 |
| | | | | | 210/500.39 |

(Continued)

FOREIGN PATENT DOCUMENTS

CN           204703728 U    * 10/2015  ............. B01D 46/54

OTHER PUBLICATIONS

English language machine translation for CN 204703728 U. Retrieved from translationportal.epo.org on Feb. 22, 2022. (Year: 2022).*

*Primary Examiner* — Jason M Greene
(74) *Attorney, Agent, or Firm* — Wang Law Firm, Inc.

(57) ABSTRACT

The disclosure discloses an anti-haze anti-harmful gas air filter membrane as well as a preparation method and application thereof. The air filter membrane comprises a nano fiber membrane made of nano fibers and having a two-dimensional or three-dimensional network structure. The nano fiber membrane can be a high-molecular polymer nano fiber membrane prepared by utilizing an electrostatic spinning process, and can also be doped with an organic or inorganic additive capable of adsorbing and absorbing harmful gases, such as VOCs, $NO_x$, $SO_x$ and $NH_3$, in the air and/or a photocatalyst capable of degrading these harmful gases in a photocatalysis manner, or the like. The anti-haze anti-harmful gas air filter membrane disclosed by the disclosure can efficiently filter PM2.5 and PM10 particulate (Continued)

pollutants and the like in the air and simultaneously can efficiently identify and clear multiple harmful gases in the air. The anti-haze anti-harmful gas air filter membrane has a wide application prospect in the field of air purification, for example, can be applied to air purification devices, such as screen windows, gauze masks and filter screens.

5 Claims, 5 Drawing Sheets

(51) Int. Cl.
  *B01D 46/00* (2022.01)
  *B01D 46/54* (2006.01)
  *B01D 53/22* (2006.01)
  *B01D 53/86* (2006.01)
  *B01D 69/02* (2006.01)
  *B01D 71/42* (2006.01)
  *B01J 20/26* (2006.01)
  *B01J 20/28* (2006.01)
  *B01J 23/30* (2006.01)
  *B01J 31/06* (2006.01)
  *B01J 31/34* (2006.01)
  *B01J 35/00* (2006.01)
  *B01J 35/06* (2006.01)
  *E06B 9/52* (2006.01)
  *B01D 39/08* (2006.01)

(52) U.S. Cl.
  CPC ....... *B01D 46/0036* (2013.01); *B01D 46/543* (2013.01); *B01D 53/228* (2013.01); *B01D 53/229* (2013.01); *B01D 53/8609* (2013.01); *B01D 53/8625* (2013.01); *B01D 53/8634* (2013.01); *B01D 53/8687* (2013.01); *B01D 69/02* (2013.01); *B01D 71/42* (2013.01); *B01J 20/261* (2013.01); *B01J 20/28038* (2013.01); *B01J 23/30* (2013.01); *B01J 31/06* (2013.01); *B01J 31/34* (2013.01); *B01J 35/004* (2013.01); *B01J 35/065* (2013.01); *E06B 9/52* (2013.01); *B01D 2053/221* (2013.01); *B01D 2239/025* (2013.01); *B01D 2239/0407* (2013.01); *B01D 2239/0631* (2013.01); *B01D 2255/20776* (2013.01); *B01D 2255/802* (2013.01); *B01D 2259/4508* (2013.01); *B01D 2259/4541* (2013.01); *B01D 2325/10* (2013.01); *B01D 2325/12* (2013.01); *B01D 2325/44* (2013.01)

(56) References Cited

U.S. PATENT DOCUMENTS

| | | | |
|---|---|---|---|
| 2016/0166959 A1* | 6/2016 | Cui | B01D 39/1623 |
| | | | 204/192.12 |
| 2016/0220927 A1* | 8/2016 | Kwok | B01D 39/2041 |
| 2016/0271583 A1* | 9/2016 | Kenmore | B01J 20/28016 |
| 2020/0298170 A1* | 9/2020 | Wendland | B01D 53/0407 |

* cited by examiner

ANTI-HAZE ANTI-HARMFUL GAS AIR FILTER MEMBRANE AS WELL AS PREPARATION METHOD AND APPLICATION THEREOF

TECHNICAL FIELD

The disclosure relates to an air purification device, and particularly relates to an anti-haze anti-harmful gas air filter membrane as well as a preparation method and application thereof. The anti-haze anti-harmful gas air filter membrane is high in transparency and air permeability, and is capable of performing color response and degradation on harmful gases.

BACKGROUND

Since air pollutants brought by human activities are substantially discharged at present, air quality of many cities in the world has seriously threaten people's physical and psychological health. Air pollutants comprise haze particles, volatile organic compounds (VOCs), ammonia gas (NH3), oxynitride ($NO_x$) and oxysulfide ($SO_x$). PM particles consist of small solid particles and liquid drops and are traditionally classified into PM 2.5 particles and PM10 particles, VOCs gases comprise formaldehyde and acetaldehyde. Harm caused by these air pollutants has attracted world's attention, and filtration is the most widely applied air purification method. For example, CN201802288U discloses a composite screen window net for an anti-dust screen window, wherein, filtration and adsorption of dusts and harmful gases can be achieved by designing an activated carbon spongy layer in the composite screen window, but, the composite screen window net is poor in transparency and air permeability, and cannot detect and degrade harmful gases.

SUMMARY

The object of the disclosure is to provide an anti-haze anti-harmful gas air filter membrane as well as a preparation method and application thereof to overcome the disadvantages of the prior art.

In order to achieve the above object, the technical solution adopted by the disclosure includes:

An embodiment of the disclosure provides an anti-haze anti-harmful gas air filter membrane, comprising a nano fiber membrane made of nano fibers with a diameter of 200~2000 nm and having a two-dimensional or three-dimensional network structure, the nano fiber membrane at least being used for filtering particulate matters having a particle size not less than a set threshold in the air.

Further, the particulate matters having a particle size not less than a set threshold are particulate matters having a particle size larger than or equal to PM10, preferably, particulate matters having a particle size larger than or equal to PM2.5.

Preferably, when the transmittance of the air filter membrane is less than 90%, the obstruction efficiency of the air filter membrane on PM2.5 particles is greater than 95%.

Further, the surface of the nano fiber is smooth, or is of a folded structure. Or, more preferably, the nano fiber is of a porous structure, for example, the surface is of a porous structure or the entirety is of a connective three-dimensional porous structure.

Further, the nano fiber adopts a high-molecular polymer nano fiber.

In some preferred embodiments, the nano fiber also comprises an organic or inorganic additive at least used for absorbing and/or degrading selected chemical substances in the air. The selected chemical substances can be volatile organic compounds (VOCs), ammonia gas ($NH_3$), oxynitride ($NO_x$), oxysulfide ($SO_x$) and the like, or a combination thereof.

Further preferably, the organic or inorganic additive is selected from organic or inorganic additives at least used for absorbing selected chemical substances in the air and generating color response.

Further preferably, the organic or inorganic additive is selected from photocatalysts.

Further, the nano fiber membrane can be prepared by an electrostatic spinning process.

Further, the transmittance of the air filer membrane is 0~95%, preferably, 0~30% or 30%~95%.

An embodiment of the disclosure also provides a method for preparing the anti-haze anti-harmful gas air filter membrane, comprising:

providing polymer solution containing or not containing the organic or inorganic additive, and performing electrostatic spinning on the polymer solution to prepare a self-supporting nano fiber membrane or the nano fiber membrane binging to a porous base.

An embodiment of the disclosure also provides application of the anti-haze anti-harmful gas air filter membrane in the field of air purification.

Compared to the prior art, the anti-haze anti-harmful gas air filter membrane provided by the disclosure can efficiently filter PM2.5 and PM10 particulate pollutants and the like in the air and simultaneously can efficiently identify and clear multiple harmful gases in the air, and has a wide application prospect in the field of air purification.

DESCRIPTION OF THE EMBODIMENTS

In view of the disadvantages of the prior art, the inventor of the present application puts forward the technical solution of the disclosure via relevant researches and lots of practice. The technical solution will be explained in detail below.

One aspect of an embodiment of the disclosure provides an anti-haze anti-harmful gas air filter membrane, comprising a nano fiber membrane made of nano fibers with a diameter of 200~2000 nm and having a two-dimensional or three-dimensional network structure, the nano fiber membrane at least being used for filtering particulate matters having a particle size not less than a set threshold.

Further, the particulate matters having a particle size not less than a set threshold are particulate matters having a particle size larger than or equal to PM10.

More further, the particulate matters having a particle size not less than a set threshold are particulate matters having a particle size larger than or equal to PM2.5.

Further, the transmittance of the air filter membrane is 0~95%, preferably, 0~30% or 30%~95%, especially preferably, more than 70%~80%.

Further, when the transmittance of the air filter membrane is less than 90%, the obstruction efficiency of the air filter membrane on PM2.5 particles is greater than 95%.

More particularly, when the transmittance of the air filter membrane is 80% and passed air speed is 4 cm/s, the obstruction efficiency of the air filter membrane on PM10 particles is greater than 99%, and the obstruction efficiency of the air filter membrane on PM2.5 particles is greater than 99% as well.

Further, the air filter membrane can be non-transparent, semitransparent, or completely transparent.

Further, the thickness of the air filter membrane can be different, for example, can be 5~5000 μm, preferably, 100~5000 μm, or can also preferably be 5~100 μm, especially preferably, 15~30 μm.

In some embodiments, the surface of the nano fiber is smooth.

In some preferred embodiments, the surface of the nano fiber is of a folded structure, namely, the nano fiber is a folded nano fiber, preferably, the fluctuation degree of the folded structure relative to a nano fiber body is 0~30%.

In some more preferred embodiments, the nano fiber is of a porous structure, namely, the nano fiber is a porous fiber, preferably, the pore coverage of the surface of the nano fiber is 0~60%.

When the above folded nano fiber, porous nano fiber or nano fiber having similar morphology (especially the porous nano fiber) is adopted, it will be beneficial to efficiently promote the formed nano fiber membrane to adsorb and capture harmful gases such as volatile organic compounds (VOCs), $NO_x$, $SO_x$ and $NH_3$ in the air.

Figure 1:
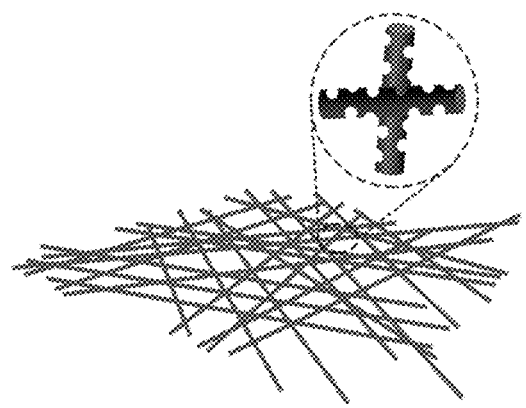
FIG. 1 is a structural diagram of a nano fiber membrane based on a porous fiber according to an exemplary embodiment of the disclosure.

In an exemplary embodiment of the disclosure, the structure of a nano fiber membrane based on the above porous nano fiber can be as shown in FIG. 1.

Further, the nano fiber adopts a high-molecular polymer nano fiber. Preferably, the material of the nano fiber comprises polyvinyl butyral (PVB), or polyacrylonitrile (PAN), or polyvinylpyrrolidone (PVP), or polyoxyethylene (PEO), or polymethyl methacrylate (PMMA) or polyamide (PA).

In some preferred embodiments, the nano fiber also comprises an organic or inorganic additive at least used for absorbing and/or degrading selected chemical substances in the air, wherein, the selected chemical substance comprises one or more of volatile organic compounds (VOCs), oxynitride ($NO_x$), oxysulfide ($SO_x$) and ammonia gas ($NH_3$), and is not limited thereto.

Further, the organic or inorganic additive can be selected from organic or inorganic additives at least used for absorbing selected chemical substances in the air and generating color response. Preferably, the addition amount of the organic or inorganic additive in the nano fiber membrane is sufficient so that color response generated when the nano fiber membrane absorbs the selected chemical substances is identified by naked eyes.

In some more preferred embodiments, the selected chemical substance is a volatile organic compound, and a corresponding organic or inorganic additive is a VOC developer; for example, the VOC developer comprises zeolite powder or p-aminothiophenol. In this way, after these developers adsorb VOCs, they can generate color response to VOCs, so that the color of the air filter membrane is correspondingly changed, which can not only remove such harmful substances in the air but also send an intuitive alarm to a user to render the user to know the categories of the harmful substances in the air.

In some more preferred embodiments, the selected chemical substance is ammonia gas, and a corresponding organic or inorganic additive is an ammonia gas developer; preferably, the ammonia gas developer comprises Prussian blue; after the ammonia gas developer adsorbs the ammonia gas, the color of the air filter membrane is changed.

In some more preferred embodiments, the selected chemical substance is oxynitride, and a corresponding organic or inorganic additive is an oxynitride developer; preferably, the oxynitride developer comprises aminobenzene sulfonamide or diamino fluorescein; after the oxynitride developer adsorbs the oxynitride, the color of the air filter membrane is changed.

In some more preferred embodiments, the selected chemical substance is oxysulfide, and a corresponding organic or inorganic additive is an oxysulfide developer; preferably, the oxysulfide developer comprises litmus. After the oxysulfide developer adsorbs the oxysulfide, the color of the air filter membrane is changed.

Further, the organic or inorganic additive is selected from photocatalysts, for example, $TiO_2$, $ZnO$, $W_{18}O_{49}$ or $WO_3$, so that the air filter membrane can filter particulate pollutants in the air and simultaneously can further degrade harmful gases such as VOCs gases (such as formaldehyde and acetaldehyde) among them.

Of course, in some embodiments, the nano fiber can simultaneously comprise the above various developers and photocatalysts to achieve an effect of jointly clearing the harmful gases in the air.

Further, the nano fiber membrane can be self-supporting and is not attached to a base, or can bind to the base. These bases preferably adopt a porous base, for example, can select a stainless steel wire mesh, a glass fiber net, a nylon net, an aluminum alloy silk screen and the like. Preferably, the aperture of holes contained in these bases is 200~20 meshes.

In some embodiments, the nano fiber membrane is prepared by an electrostatic spinning process.

Anther aspect of an embodiment of the disclosure provides a method for preparing the anti-haze anti-harmful gas air filter membrane, comprising:

providing polymer solution containing or not containing the organic or inorganic additive, and performing electrostatic spinning on the polymer solution to prepare a self-supporting nano fiber membrane or a nano fiber membrane binging to the porous base.

Further, the polymer solution can be formed by dissolving a high-molecular polymer into a solvent in any manners known in the art. Preferably, the above one or more organic or inorganic additives can also be uniformly dispersed or dissolved into the polymer solution.

Further, the above electrostatic spinning process can be achieved by utilizing various appropriate electrostatic spinning equipment in a manner known in the art.

In summary, the anti-haze anti-harmful gas air filter membrane of the disclosure is formed based on the nano fiber membrane, which not only has high obstruction efficiency on PM2.5 and PM10 particulate pollutants in the air, but also can identify harmful gases such as a volatile organic compound (VOC), $NO_x$, $SO_x$ and $NH_3$ in the air through color response and other manners, and can efficiently clear such harmful gases in combination with adsorption, photocatalytic degradation and other manners.

Yet another aspect of an embodiment of the disclosure also provides application of the anti-haze anti-harmful gas air filter membrane in the field of air purification.

For example, the air filter membrane can be applied to prepare air purification products, such as screen windows, gauze masks, or filter nets, but not limited thereto.

Next, the technical solution of the disclosure will be further described in detail through several embodiments in combination with accompanying drawings. However, the selected embodiments are only for describing the disclosure, but do not limit the scope of the disclosure.

Figure 2:
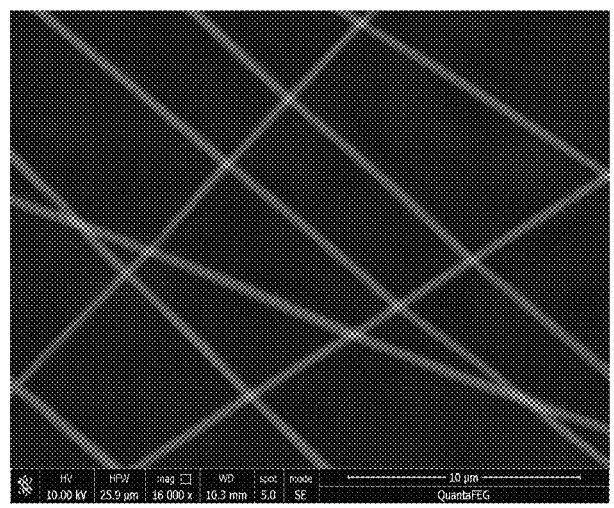
FIG. 2 is a scanning electron microscope image of a PAN nano fiber according to embodiment 1 of the disclosure.
Figure 3:
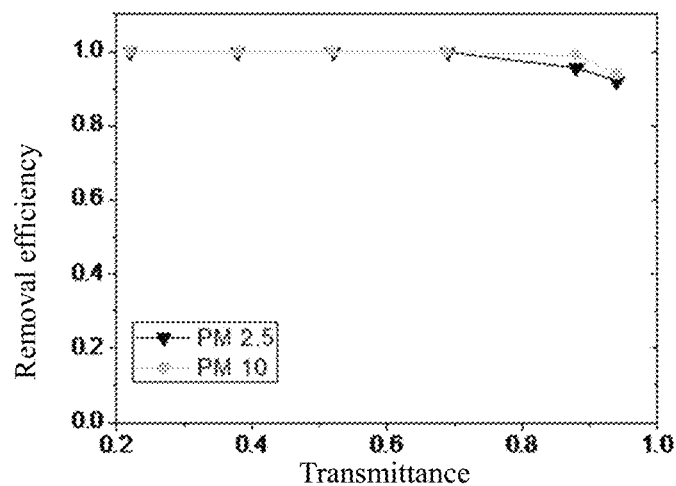
FIG. 3 is a test pattern of removal efficiency of a PAN nano fiber membrane on PM2.5 and PM10 particles according to embodiment 1 of the disclosure.

Embodiment 1: an anti-haze anti-harmful gas air filter membrane involved in this embodiment comprises a PAN nano fiber membrane which is prepared by utilizing an electrostatic spinning process. Corresponding electrostatic spinning process parameters are as follows: spinning solution is 8 wt % PAN solution, the weight-average molecular weight of PAN is 150000, a solvent is dimethylformamide, a voltage is 25 kV, and a base is carried by a stainless steel wire mesh. Referring to FIG. 2, it is an SEM image of a PAN nano fiber constituting the nano fiber membrane. The air filter membrane can efficiently obstruct the pass of PM2.5 and PM10 particles. FIG. 3 is a result diagram of obstruction efficiencies of nano fiber membranes having different transmittances on PM2.5 and PM10 particles in the breeze according to this embodiment.

Figure 4:
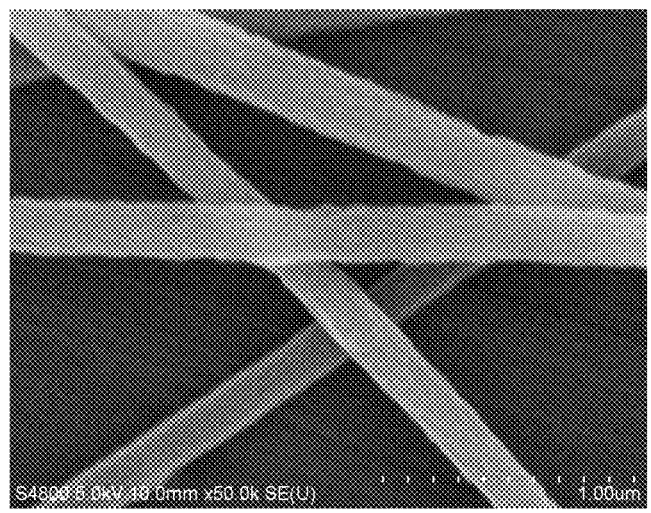
FIG. 4 is a scanning electron microscope image of a folded PAN nano fiber according to embodiment 2 of the disclosure.

Embodiment 2: an anti-haze anti-harmful gas air filter membrane involved in this embodiment comprises a PAN nano folded fiber membrane which is prepared by utilizing an electrostatic spinning process. Corresponding electrostatic spinning process parameters are as follows: spinning solution is 9 wt % PVP/PAN mixed solution in a mass ratio of 1/2, a solvent is dimethylformamide, the weight-average molecular weight of PVP is 58000, the weight-average molecular weight of PAN is 150000, a voltage is 25 kV, a base is carried by a stainless steel wire mesh, and subsequently, the membrane obtained by electrostatic spinning is washed and dipped in water and then taken out. Referring to FIG. 4, it is an SEM image of a folded PAN nano fiber constituting the nano fiber membrane. The air filter membrane can efficiently obstruct the pass of PM2.5 and PM10 particles (obstruction efficiency is superior to that in embodiment 1), and has a strong harmful gas capture capability, as detailed in Table 1 below.

Figure 5:
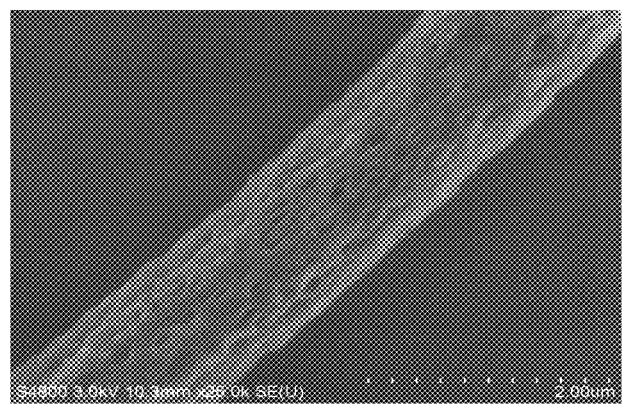
FIG. 5 is a scanning electron microscope image of a PAN nano fiber according to embodiment 3 of the disclosure.
Figure 6A:
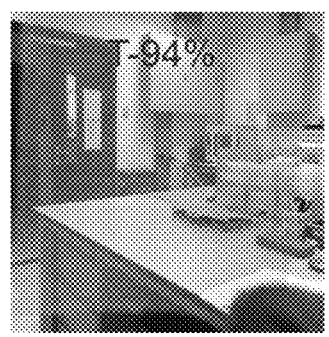
FIG. 6a-FIG. 6f are optical photographs of air filter membranes having different transmittances according to embodiment 4 of the disclosure.
Figure 6B:
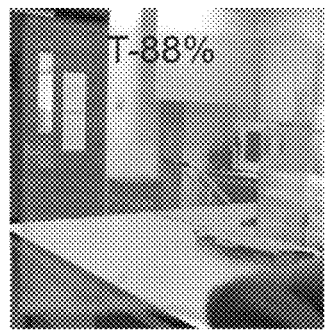
Figure 6C:
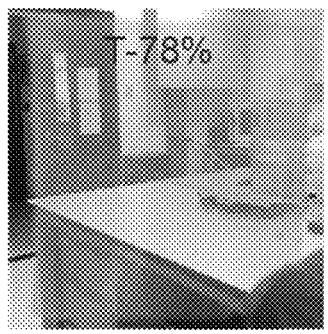
Figure 6D:
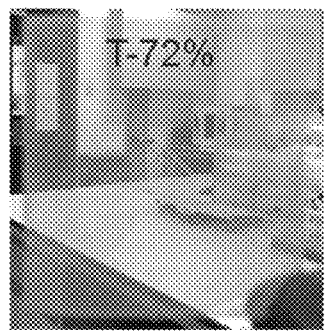
Figure 6E:
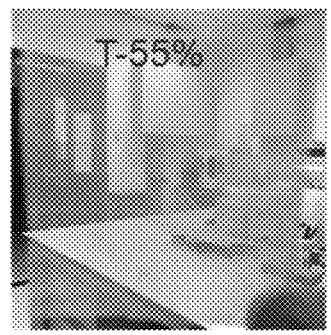
Figure 6F:

Embodiment 3: an anti-haze anti-harmful gas air filter membrane involved in this embodiment comprises a PVB porous fiber membrane which is prepared by utilizing an electrostatic spinning process. Corresponding electrostatic spinning process parameters are as follows: spinning solution is 6 wt % PVB solution, the weight-average molecular weight of PVB is 90000-120000, a solvent is a mixed solvent of tetrahydrofuran (THF) and dimethylsulfoxide (DMSO) (a volume ratio is 95/5), and a voltage is 25 kV. Referring to FIG. 5, it is an SEM image of a PVB porous fiber constituting the nano fiber membrane. The air filter membrane can efficiently obstruct the pass of PM2.5 and PM10 particles (obstruction efficiency is superior to that in embodiment 1), and has a strong harmful gas capture capability, as detailed in Table 2 below.

Figure 7:
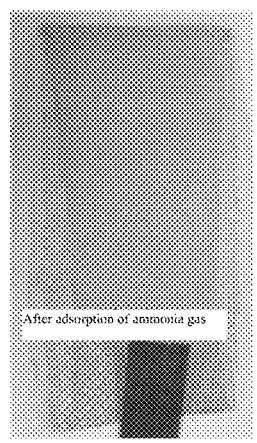
FIG. 7 is a diagram of change in color of an air filter membrane before and after adsorption of ammonia gas according to embodiment 4 of the disclosure.

Embodiment 4: an anti-haze anti-harmful gas air filter membrane involved in this embodiment comprises a PVB/PB porous fiber membrane which is prepared by utilizing an electrostatic spinning process. Corresponding electrostatic spinning process parameters are as follows: spinning solution is 6 wt % PVB solution (added with 2 wt % PB dye), a solvent is a mixed solvent of THF and DMSO, a volume ratio is 95/5, and a voltage is 25 kV. The air filter membrane can efficiently obstruct the pass of PM2.5 and PM10 particles (obstruction efficiency is superior to that in embodiment 1) and adsorbs harmful gases such as ammonia gas (capture efficiency is close to that in embodiment 3), and generates color change after adsorbing ammonia gas. Referring to FIG. 6a-FIG. 6e, they respectively show pictures of a series of air filter membranes having different transmittances prepared in this embodiment. FIG. 7 shows change in color of one of air filter membranes before and after adsorption of ammonia gas (blue→white).

Embodiment 5: an anti-haze anti-harmful gas air filter membrane involved in this embodiment comprises a polyoxyethylene (PEO) nano fiber membrane which is prepared by utilizing an electrostatic spinning process. Corresponding electrostatic spinning process parameters are as follows: spinning solution is 10 wt % PEO solution, the weight-average molecular weight of PEO is 10000, a solvent is water, and a voltage is 30 kV, and a base is carried by a stainless steel wire mesh. The air filter membrane can efficiently obstruct the pass of PM2.5 and PM10 particles (obstruction efficiency is superior to that in embodiment 1).

Embodiment 6: an anti-haze anti-harmful gas air filter membrane involved in this embodiment comprises a polymethylmethacrylate (PMMA) nano fiber membrane which is prepared by utilizing an electrostatic spinning process. Corresponding electrostatic spinning process parameters are as follows: spinning solution is 20 wt % PEO solution, the weight-average molecular weight of PMMA is 500000, a solvent is ethyl acetate, and a voltage is 30 kV, and a base is carried by a stainless steel wire mesh. The air filter membrane can efficiently obstruct the pass of PM2.5 and PM10 particles (obstruction efficiency is close to that in embodiment 1).

Embodiment 7: an anti-haze anti-harmful gas air filter membrane involved in this embodiment comprises a PAN/W18O49 nano fiber membrane which is prepared by utilizing an electrostatic spinning process. Corresponding electrostatic spinning process parameters are as follows: spinning solution is 8 wt % PAN and 1 wt % W18O49 nanowire solution, the weight-average molecular weight of PAN is 150000, a solvent is dimethylformamide, and a voltage is 25 kV, and a base is carried by a stainless steel wire mesh. The air filter membrane can efficiently obstruct the pass of PM2.5 and PM10 particles (obstruction efficiency is superior to that in embodiment 1) and can absorb VOC gases in the air, and is degraded under the illumination. Table 3 shows test results of degradation of an air filter membrane on acetaldehyde under the illumination according to this embodiment.

Embodiment 8: an anti-haze anti-harmful gas air filter membrane involved in this embodiment comprises a PVB/PB porous fiber membrane which is prepared by utilizing an electrostatic spinning process. Corresponding electrostatic spinning process parameters are as follows: spinning solution is 6 wt % PVB solution (added with 1 wt % p-aminothiophenol ATP), a solvent is a mixed solvent of THF and DMSO, a volume ratio is 95/5, and a voltage is 25 kV. The air filter membrane can efficiently obstruct the pass of PM2.5 and PM10 particles (obstruction efficiency is superior to that in embodiment 1), and has a strong harmful gas capture capability (close to those in embodiments 3 and 4).

TABLE 1

| Materials | Adsorption quantity of acetaldehyde |
|---|---|
| PAN smooth fiber | 2.73 mg/g |
| PAN folded fiber | 5.56 mg/g |

TABLE 2

| Materials | Adsorption quantity of acetaldehyde |
|---|---|
| PVB smooth fiber | 2.32 mg/g |
| PVB folded fiber | 4.36 mg/g |
| PVB porous fiber | 7.17 mg/g |

TABLE 3

| Illumination time | Reduction quantity of acetaldehyde |
|---|---|
| 0 | 8.12 mg/g |
| 3 h | 11.43 mg/g |
| 6 h | 14.54 mg/g |
| 12 h | 19.21 mg/g |

The above embodiments are only for helping to understand the core thought of the method of disclosure, and their descriptions are specific and detailed, but are hereby construed as limiting the scope of the disclosure. It should be noted that for persons of ordinary skill in the art, several transformations and improvements can also be made without departing from the concept of the disclosure, which all fall within the protection scope of the disclosure. Multiple modifications to these embodiments are apparent to specialized persons in the art, and a general principle defined herein can be realized in other embodiments without departing from the spirit or scope of the disclosure. Thus, the protection scope of the present invention patent should be based on appended claims, is not limited to these embodiments described herein, and necessarily conforms to the scope consistent with principle and features disclosed herein.

What is claimed is:

1. An anti-haze anti-harmful gas air filter membrane, comprising a nano fiber membrane made of nano fibers with a diameter of 200~4000 nm and having a two-dimensional or three-dimensional network structure, the nano fiber membrane at least being used for filtering particulate matters having a particle size not less than a set threshold in the air; wherein the surface of the nano fiber is of a folded structure, a fluctuation degree of the folded structure relative to a nano fiber body is 0~30%; and wherein the nanofiber comprises an organic or inorganic additive which is an ammonia gas developer, the ammonia gas developer including prussian blue for absorbing ammonia in the air and generating color response, and the amount of prussian blue in the nanofiber is sufficient to make the color response generated by the nanofiber when absorbing ammonia recognizable to a naked eye.

2. The anti-haze anti-harmful gas air filter membrane according to claim 1, wherein, the transmittance of the air filter membrane is 0~95% when the transmittance of the air filter membrane is less than 90%, the obstruction efficiency of the air filter membrane on PM2.5 particles is greater than 95%.

3. The anti-haze anti-harmful gas air filter membrane according to claim 1, wherein, the particulate matters having a particle size not less than a set threshold are particulate matters having a particle size larger than or equal to PM10.

4. The anti-haze anti-harmful gas air filter membrane according to claim 1, also comprising a porous base binding to the nano fiber membrane, wherein the aperture of holes contained in the porous base is 200~20 meshes and wherein the porous base comprises any one or a combination of two or more of a stainless steel wire mesh, a glass fiber net, a nylon net and an aluminum alloy silk screen.

5. The anti-haze anti-harmful gas air filter membrane according to claim 1, wherein, the nano fiber membrane is prepared by an electrostatic spinning process.

* * * * *